(12) United States Patent
Nishimoto (10) Patent No.: US 12,528,196 B2
(45) Date of Patent: Jan. 20, 2026

(54) WORKPIECE PICKING METHOD AND WORKPIECE PICKING SYSTEM

(71) Applicant: FUJI CORPORATION, Chiryu (JP)

(72) Inventor: Takeshi Nishimoto, Fuso-cho (JP)

(73) Assignee: FUJI CORPORATION, Chiryu (JP)

( * ) Notice: Subject to any disclaimer, the term of this patent is extended or adjusted under 35 U.S.C. 154(b) by 101 days.

(21) Appl. No.: 18/291,419

(22) PCT Filed: Aug. 6, 2021

(86) PCT No.: PCT/JP2021/029400
§ 371 (c)(1),
(2) Date: Jan. 23, 2024

(87) PCT Pub. No.: WO2023/013056
PCT Pub. Date: Feb. 9, 2023

(65) Prior Publication Data
US 2024/0227194 A1    Jul. 11, 2024

(51) Int. Cl.
*B25J 9/16*    (2006.01)
*B25J 13/08*    (2006.01)

(52) U.S. Cl.
CPC .................. *B25J 9/1697* (2013.01)

(58) Field of Classification Search
CPC ........ B25J 9/1697; B25J 9/1612; B25J 13/08; G05B 2219/39543; G05B 2219/40053;
(Continued)

(56) References Cited

U.S. PATENT DOCUMENTS 5,568,593 A * 10/1996 Demarest ............... B25J 9/1697
901/7
6,328,523 B1 * 12/2001 Watanabe .............. B25J 9/1697
414/811
(Continued)

FOREIGN PATENT DOCUMENTS

WO    WO 2019/097650 A1    5/2019

OTHER PUBLICATIONS

International Search Report Issued Oct. 26, 2021, in PCT/JP2021/029400, filed on Aug. 6, 2021, therein, 2 pages.

*Primary Examiner* — Jaime Figueroa
(74) *Attorney, Agent, or Firm* — Oblon, McClelland, Maier & Neustadt, L.L.P.

(57) ABSTRACT

A workpiece picking method for picking up workpieces supplied in a randomly placed state onto a supply stage larger than an imaging range corresponding to an angle of view of an imaging section, the workpiece picking method includes: (a) a step of performing picking processing of selecting a workpiece, and causing the picking section to pick up the workpiece; (b) a step of acquiring a remaining number of the workpieces remaining after the picking processing for each region; (c) a step of supplying a new workpiece onto the supply stage and loosening a lump of the workpieces, or performing loosening without supplying the new workpiece, based on the remaining number of the workpieces for each region; and (d) a step of performing the picking processing after the loosening operation in a largest-number region having a largest remaining number of the workpieces for each region acquired after the picking processing.

6 Claims, 6 Drawing Sheets

(58) Field of Classification Search
CPC ........... G05B 2219/40564; G05B 2219/40584;
H05K 13/02
USPC ................. 700/245–264; 318/568.11–568.25
See application file for complete search history.

(56) References Cited

U.S. PATENT DOCUMENTS

| | | | | |
|---|---|---|---|---|
| 7,996,114 | B2* | 8/2011 | Ban | B25J 9/1697 382/153 |
| 10,894,316 | B2* | 1/2021 | Kinoshita | B25J 9/0093 |
| 11,222,417 | B2* | 1/2022 | Oishi | G06F 18/22 |
| 11,254,522 | B2* | 2/2022 | Deng | B65G 59/02 |
| 11,602,857 | B2* | 3/2023 | Galluzzo | G06Q 10/087 |
| 11,613,431 | B2* | 3/2023 | Marx | B23P 19/008 700/228 |
| 11,645,778 | B2* | 5/2023 | Min | G06F 18/28 382/152 |
| 2006/0104788 | A1* | 5/2006 | Ban | G06T 1/0014 414/729 |
| 2007/0274812 | A1* | 11/2007 | Ban | B25J 9/1697 414/217 |
| 2007/0282485 | A1* | 12/2007 | Nagatsuka | G05B 19/4069 700/245 |
| 2010/0063629 | A1* | 3/2010 | Battisti | B25J 9/1697 700/259 |
| 2011/0284344 | A1* | 11/2011 | Perroud | B65G 27/34 198/752.1 |
| 2013/0211593 | A1* | 8/2013 | Domae | B25J 9/1612 700/258 |
| 2015/0003678 | A1* | 1/2015 | Watanabe | B25J 9/1697 382/103 |
| 2015/0066200 | A1* | 3/2015 | McCarthy | B07C 5/3422 700/223 |
| 2017/0057092 | A1* | 3/2017 | Ito | B25J 9/1679 |
| 2017/0129066 | A1* | 5/2017 | Okuda | B24B 49/12 |
| 2018/0345500 | A1* | 12/2018 | Kinoshita | B25J 9/0093 |
| 2019/0358827 | A1* | 11/2019 | Guo | B25J 15/0033 |
| 2020/0027205 | A1* | 1/2020 | Oishi | B25J 15/04 |

* cited by examiner

WORKPIECE PICKING METHOD AND WORKPIECE PICKING SYSTEM

TECHNICAL FIELD

The present description discloses a workpiece picking method and a workpiece picking system.

BACKGROUND ART

Conventionally, it has been proposed that a workpiece supplied onto a supply stage in a randomly placed state is imaged by an imaging section, and a workpiece that can be picked up is selected and picked up by a robot. For example, in Patent Literature 1, the entire plate as a supply stage is configured to be uniformly vibratable, and workpieces are picked up by a robot after the workpieces are dispersed over the entire surface of the plate by the vibration, so that the entire surface of the plate is effectively used to efficiently pick up the workpieces.

PATENT LITERATURE

Patent Literature 1: WO2019/097650A1

BRIEF SUMMARY

Technical Problem

Here, the supply stage (plate) may be larger than an imaging range corresponding to an angle of view of the imaging section. In this case, when an imaging section having a wide imaging range is used in accordance with the supply stage, it lacks versatility and is disadvantageous in terms of cost. In addition, images may be captured in multiple regions obtained by dividing the supply stage based on the imaging range, and the captured images may be combined to create an entire image, but the burden of image processing increases. For this reason, it is conceivable to perform processing of capturing an image for each region and picking up a workpiece in each region, but depending on a state of dispersion of the workpiece, a region in which the workpiece does not exist may be imaged, or the like, and there is a concern that processing efficiency decreases.

A main object of the present disclosure is to efficiently pick up a workpiece from a supply stage larger than an imaging range of an imaging section.

Solution to Problem

The present disclosure employs the following means in order to achieve the main object described above.

A first workpiece picking method of the present disclosure is a workpiece picking method for picking up workpieces supplied in a randomly placed state onto a supply stage larger than an imaging range corresponding to an angle of view of an imaging section, the workpiece picking method including: (a) a step of performing picking processing of selecting a workpiece that is capable of being picked up in each of multiple regions obtained by dividing the supply stage based on the imaging range, based on an image obtained by imaging the region with the imaging section, to cause a picking section to pick up the workpiece: (b) a step of acquiring a remaining number of the workpieces remaining after the picking processing for each region: (c) a step of supplying a new workpiece onto the supply stage and performing a loosening operation for loosening a lump of the workpieces, or performing the loosening operation without supplying the new workpiece, based on the remaining number of the workpieces for each region: and (d) a step of performing the picking processing after the loosening operation in a largest-number region having a largest remaining number of the workpieces for each region acquired after the picking processing.

In the first workpiece picking method of the present disclosure, based on the remaining number of the workpieces for each region remaining after the picking processing, the new workpiece is supplied onto the supply stage and the loosening operation is performed, or the loosening operation is performed without supplying the new workpiece. In addition, in the largest-number region after the picking processing, the picking processing after the loosening operation is performed. Since there is a high probability that a region which is the largest-number region before the loosening operation has relatively many workpieces even after the loosening operation, inefficient processing such as picking processing of a region having few workpieces that can be picked up or wasteful processing such as imaging an image of a region where no workpieces exist can be prevented. Accordingly, the workpiece can be efficiently picked up from the supply stage larger than the imaging range of the imaging section.

DESCRIPTION OF EMBODIMENTS

Figure 1:
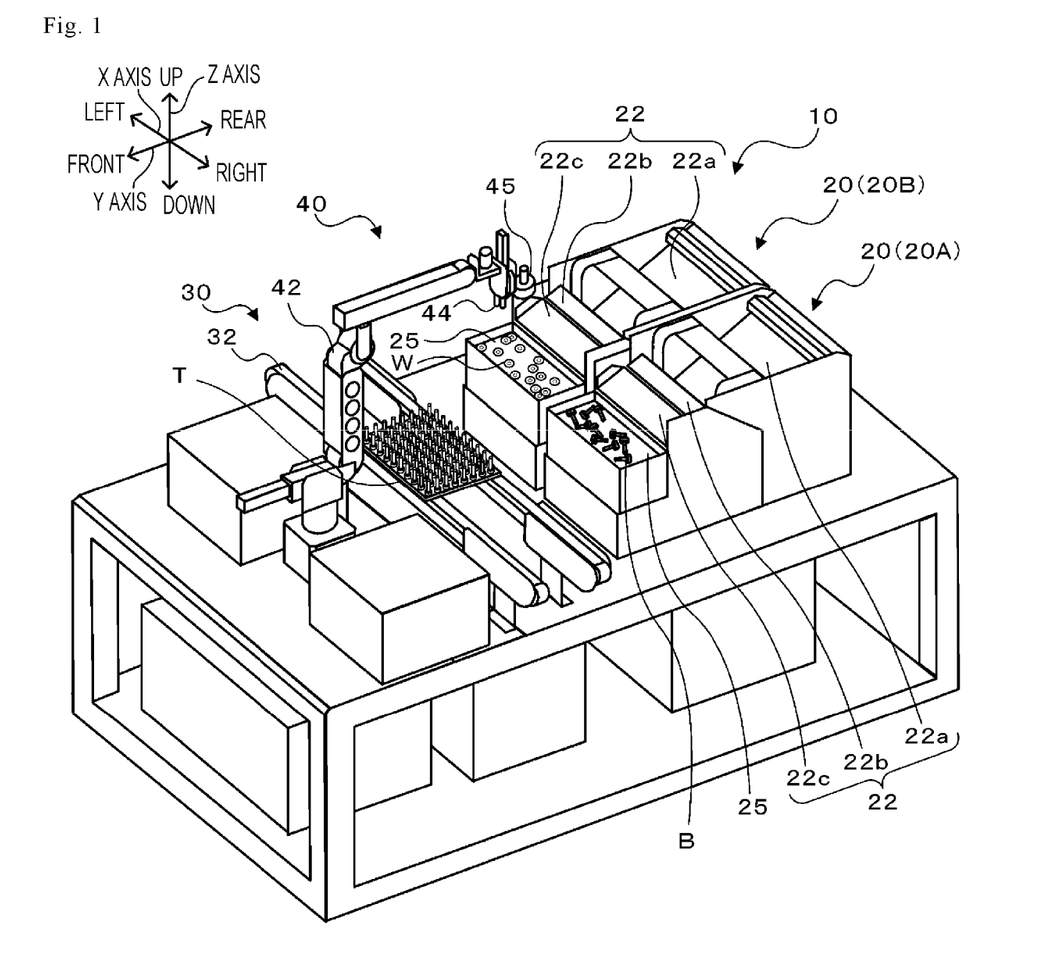
FIG. 1 is a configuration diagram illustrating a schematic configuration of work system 10.
Figure 2:
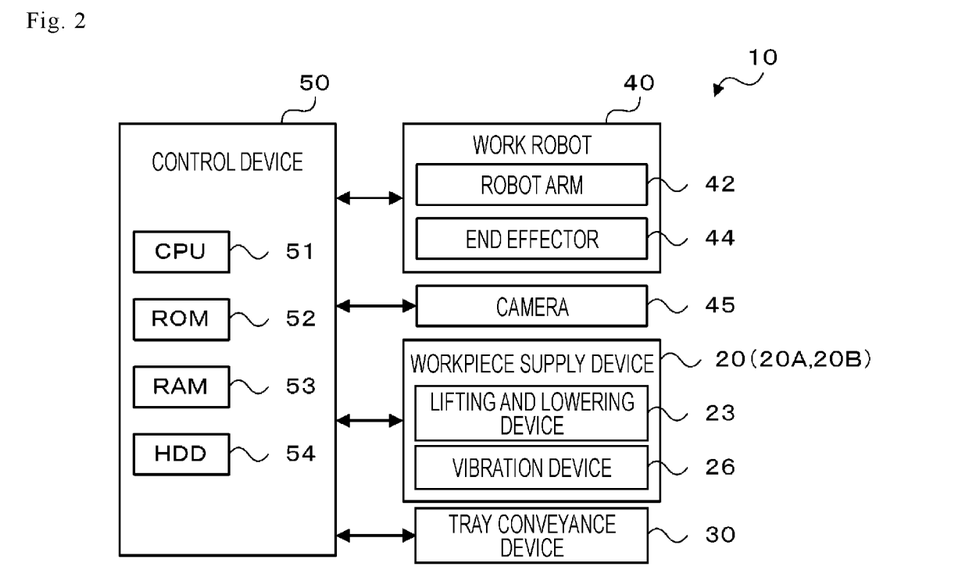
FIG. 2 is a block diagram illustrating an electrical connection relationship of work system 10.

Next, an embodiment of the present disclosure will be described with reference to the drawings. FIG. 1 is a configuration diagram illustrating a schematic configuration of work system 10. FIG. 2 is a block diagram illustrating an electrical connection relationship of work system 10. In FIG. 1, a left-right direction is an X-axis direction, a front-rear direction is a Y-axis direction, and an up-down direction is a Z-axis direction.

As illustrated in FIGS. 1 and 2, work system 10 includes workpiece supply devices 20 (20A and 20B), tray conveyance device 30, work robot 40, camera 45, and control device 50. Work system 10 performs predetermined work such as pick-and-place of a workpiece using work robot 40. For example, work robot 40 of work system 10 performs work of picking up bolt B (first workpiece) supplied in a randomly placed state, placing bolt B on tray T in the upright posture with the head facing downward, picking up washer W (second workpiece) supplied in the randomly placed state, and placing washer W to be inserted into the threaded part (rod-shaped part) of bolt B on tray T. Work system 10 is not limited to the pick-and-place type, and may be any type as long as work robot 40 subsequently picks up the supplied workpiece, for example, by picking up the workpiece and attaching the workpiece to the target object.

Work system 10 of the present embodiment includes, as workpiece supply device 20, first workpiece supply device 20A that supplies bolt B and second workpiece supply device 20B that supplies washer W. Since first workpiece supply device 20A and second workpiece supply device 20B have the same configuration, both will be described below simply as workpiece supply device 20. Workpiece supply device 20 may be any device that supplies workpieces, such as various mechanical components including bolt B and washer W, and various electronic components. In addition, work system 10 is not limited to one including two workpiece supply devices 20A and 20B, and may include one workpiece supply device 20. In addition, work system 10 may include work robots 40 corresponding to the number of workpiece supply devices 20.

Workpiece supply device 20 includes sending and feeding section 22 that sends forward a workpiece put by an operator or a replenishment robot (not illustrated), supply stage 25 on which work robot 40 is disposed to be able to pick up the workpiece, and vibration device 26 (see FIG. 2) that vibrates supply stage 25 up and down.

Sending and feeding section 22 has first inclined portion 22a, second inclined portion 22b, and third inclined portion 22c, and includes lifting and lowering device 23 (see FIG. 2) that lifts and lowers second inclined portion 22b up and down. First inclined portion 22a, second inclined portion 22b, and third inclined portion 22c are provided in this order from the rear side, and are inclined downward toward the front lower side. Second inclined portion 22b is located at a lower end of the lifting and lowering range when lifting and lowering device 23 is not operating, and an upper surface thereof is continuous with an upper surface of first inclined portion 22a. Second inclined portion 22b is located at an upper end of the lifting and lowering range when lifting and lowering device 23 is operating, and the upper surface thereof is continuous with an upper surface of third inclined portion 22c. Third inclined portion 22c is provided such that a front end thereof extends above a rear end of supply stage 25. Although not illustrated, a rear wall extending downward from a rear end of second inclined portion 22b is provided, and even when second inclined portion 22b is lifted, the workpiece on first inclined portion 22a is blocked by the rear wall of second inclined portion 22b. In addition, a rear wall extending downward from a rear end of third inclined portion 22c is provided, and the workpiece on second inclined portion 22b located at a lower end is blocked by the rear wall of third inclined portion 22c.

The workpiece put into workpiece supply device 20 flows on the front lower side on first inclined portion 22a and stays on second inclined portion 22b. When the upper surface of second inclined portion 22b which is lifted by the operation of lifting and lowering device 23 is continuous with the upper surface of third inclined portion 22c, the workpiece staying on second inclined portion 22b flows to third inclined portion 22c and falls onto supply stage 25. In this way, workpiece supply device 20 can supply the workpiece onto supply stage 25 in a randomly placed state and cause work robot 40 to pick up the workpiece on supply stage 25. In addition, workpiece supply device 20 can apply vibration to the workpiece on supply stage 25 by driving vibration device 26 to loosen (disassemble) the lump of the workpiece. This operation is referred to as a loosening operation.

Tray conveyance device 30 has a pair of belt conveyors 32 bridged in the left-right direction (the X-axis direction) at intervals in the front-rear direction (the Y-axis direction). Tray conveyance device 30 conveys tray T to a work area of work robot 40 by driving belt conveyor 32.

Work robot 40 includes, for example, vertical multi-joint robot arm 42 and end effector 44 detachably attached to a distal end link of robot arm 42. End effector 44 is configured to pick up a workpiece and includes an electromagnetic chuck, a mechanical chuck, a suction nozzle, or the like, and is appropriately selected according to the shape and material of the workpiece.

In addition, camera 45 that captures an image is also attached to robot arm 42. Camera 45 includes a single focus lens and has a constant angle of view. Camera 45 images the workpiece supplied to supply stage 25 in order to recognize the position, the number, and the posture of the workpiece, and images tray T conveyed by tray conveyance device 30 in order to recognize the position of tray T.

Figure 3:
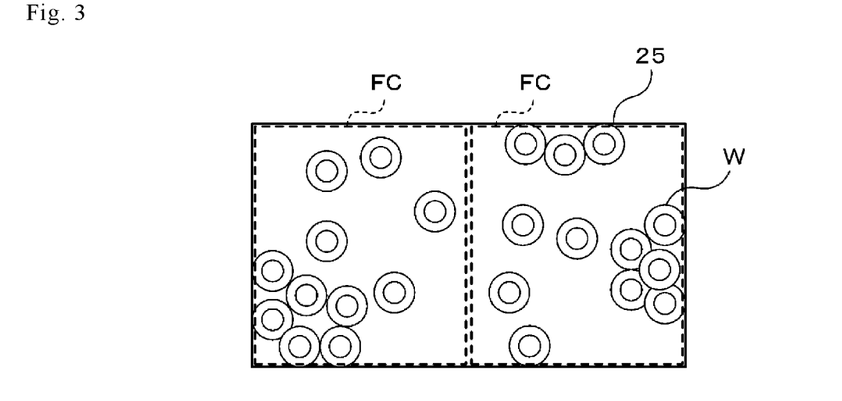
FIG. 3 is a diagram illustrating a relationship between imaging range FC of camera 45 and supply stage 25.

FIG. 3 is a diagram illustrating a relationship between imaging range FC of camera 45 and supply stage 25. In FIG. 3, a region of supply stage 25 viewed from above is indicated by a solid line, and imaging range FC is indicated by a dotted line. In addition, a state in which multiple washers W are supplied onto supply stage 25 is illustrated. Imaging range FC is a range determined on supply stage 25 based on the angle of view of camera 45, and in the present embodiment, substantially matches a region obtained by dividing supply stage 25 into two left and right regions. Therefore, it is necessary to perform imaging twice for imaging the entire region of supply stage 25 by camera 45. That is, camera 45 needs to image a first region in a state of being positioned above the first region (for example, the left region) due to the operation of robot arm 42, and to image a second region in a state of being positioned above the second region (for example, the right region) due to the operation of robot arm 42.

As illustrated in FIG. 2, control device 50 is configured as a microprocessor that is made up mainly of CPU 51, and includes, in addition to CPU 51. ROM 52 that stores various control programs. RAM 53 used as a work area. HDD 54 that stores various data, input and output port (not illustrated), and the like. Detection signals from sensors (not illustrated) included in workpiece supply device 20, tray conveyance device 30, and work robot 40, images captured by camera 45, and the like are input to control device 50. In addition, control device 50 outputs control signals to workpiece supply device 20, tray conveyance device 30, work robot 40 (robot arm 42 and end effector 44), camera 45, and the like.

Figure 4:
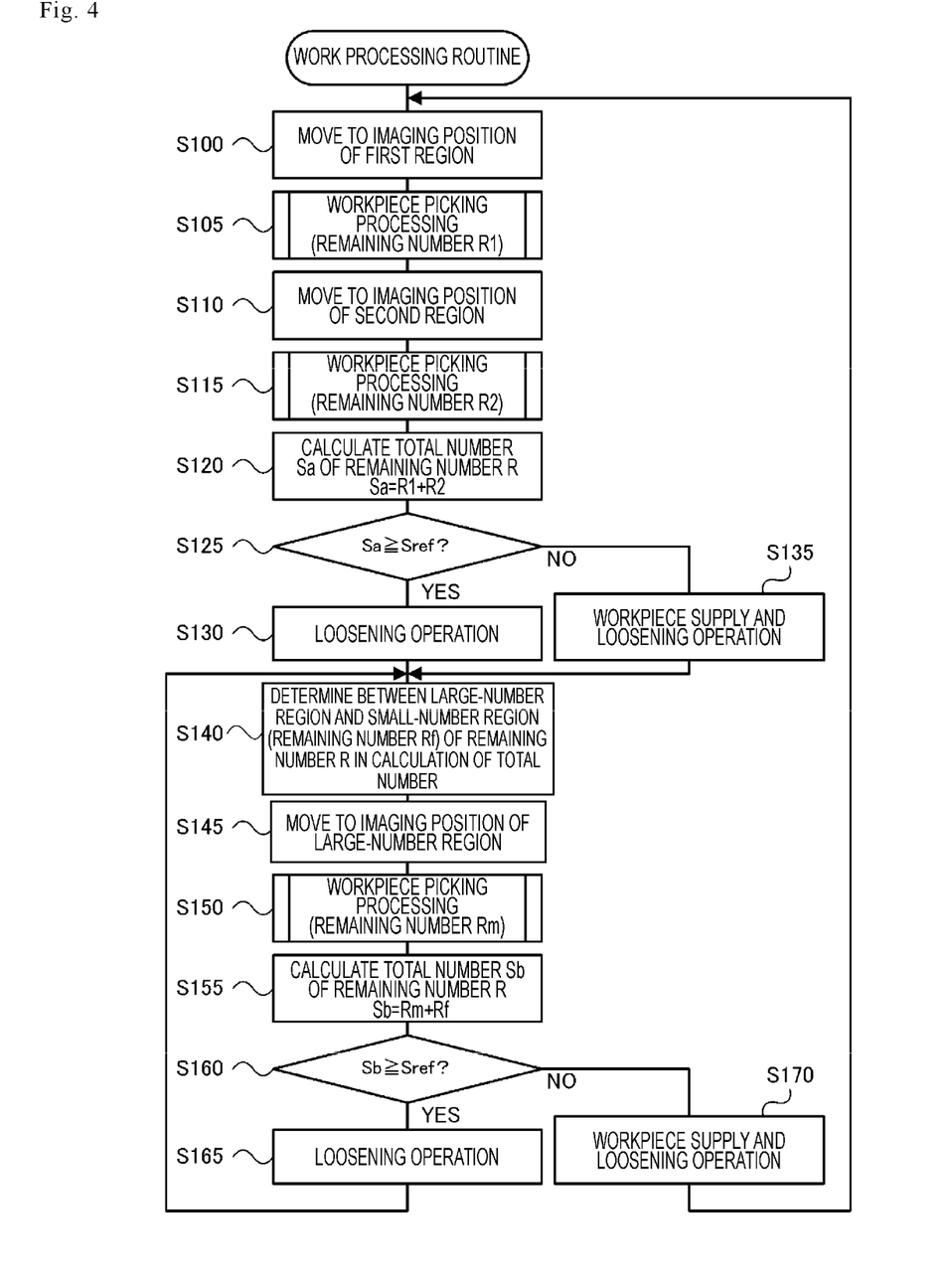
FIG. 4 is a flowchart illustrating an example of a work processing routine.

Next, the operation of work system 10 configured as described above, in particular, processing of imaging the workpiece on supply stage 25, selecting a workpiece that can be picked up, and having work robot 40 pick it up, will be described. FIG. 4 is a flowchart illustrating an example of a work processing routine. As an example of the work processing, processing of picking up washer W will be described with the left side region of supply stage 25 as a first region and the right side region thereof as a second region.

In the work processing routine of FIG. 4. CPU 51 of control device 50) first controls work robot 40 so that camera 45 moves to an imaging position of the first region (S100), and performs the workpiece picking processing of the first region (S105). When the workpiece picking processing on the first region ends. CPU 51 controls work robot 40 so that camera 45 moves to an imaging position of the second region (S110), and performs the workpiece picking processing of the second region (S115). Hereinafter, the workpiece picking processing in S105 and S115 will be described. FIG.

Figure 5:
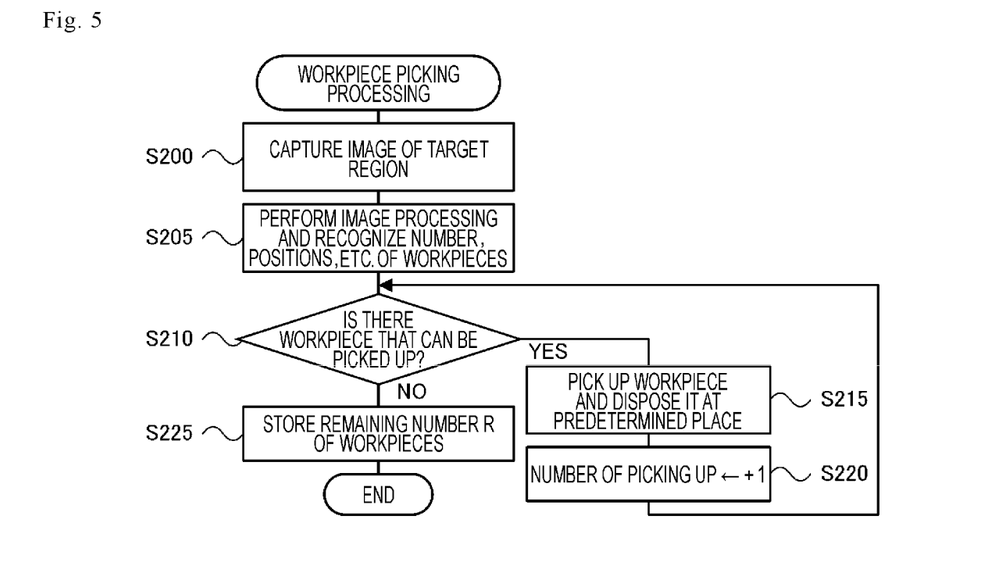
FIG. 5 is a flowchart illustrating an example of workpiece picking processing.

5 is a flowchart illustrating an example of the workpiece picking processing. The workpiece picking processing in S105 and S115 are the same processing although the target regions of the processing are different, and thus it will be described using a common flowchart.

In the workpiece picking processing of FIG. 5. CPU 51 first causes camera 45 to capture an image of the target region (S200). In the case of S105, the image of the first region is captured, and in the case of S115, the image of the second region is captured. Next. CPU 51 processes the captured image and recognizes the number, positions, etc. of workpieces (S205). In a case where the workpiece, which is a pickup target, is bolt B or the like, the posture of the workpiece or the like is also recognized. Subsequently. CPU 51 determines whether there is a workpiece that can be picked up (S210). In S210, for example, it is possible to pick up a workpiece that can be gripped by end effector 44 such as a mechanical chuck because no other workpieces overlap and there are no other workpieces or peripheral walls of supply stage 25 close to the periphery. When it is determined that there is a workpiece that can be picked up. CPU 51 picks up the workpiece and places the workpiece at a predetermined place (S215), increments the number of picking up by 1 (S220), and returns to S210. In a case of washer W, washer W is disposed to be inserted into the threaded part of bolt B in S215 as described above.

In addition, when it is determined in S210 that there is no workpiece that can be picked up. CPU 51 stores remaining number R of workpieces (S225) and ends the workpiece picking processing. Remaining number R of workpieces is obtained by subtracting the number of picking up of the workpieces incremented in S220 from the number of workpieces recognized in S205. In addition, remaining number R stored in the workpiece picking processing of the first region in S105 is set as remaining number R1, and remaining number R stored in the workpiece picking processing of the second region in S115 is set as remaining number R2.

Figure 6:
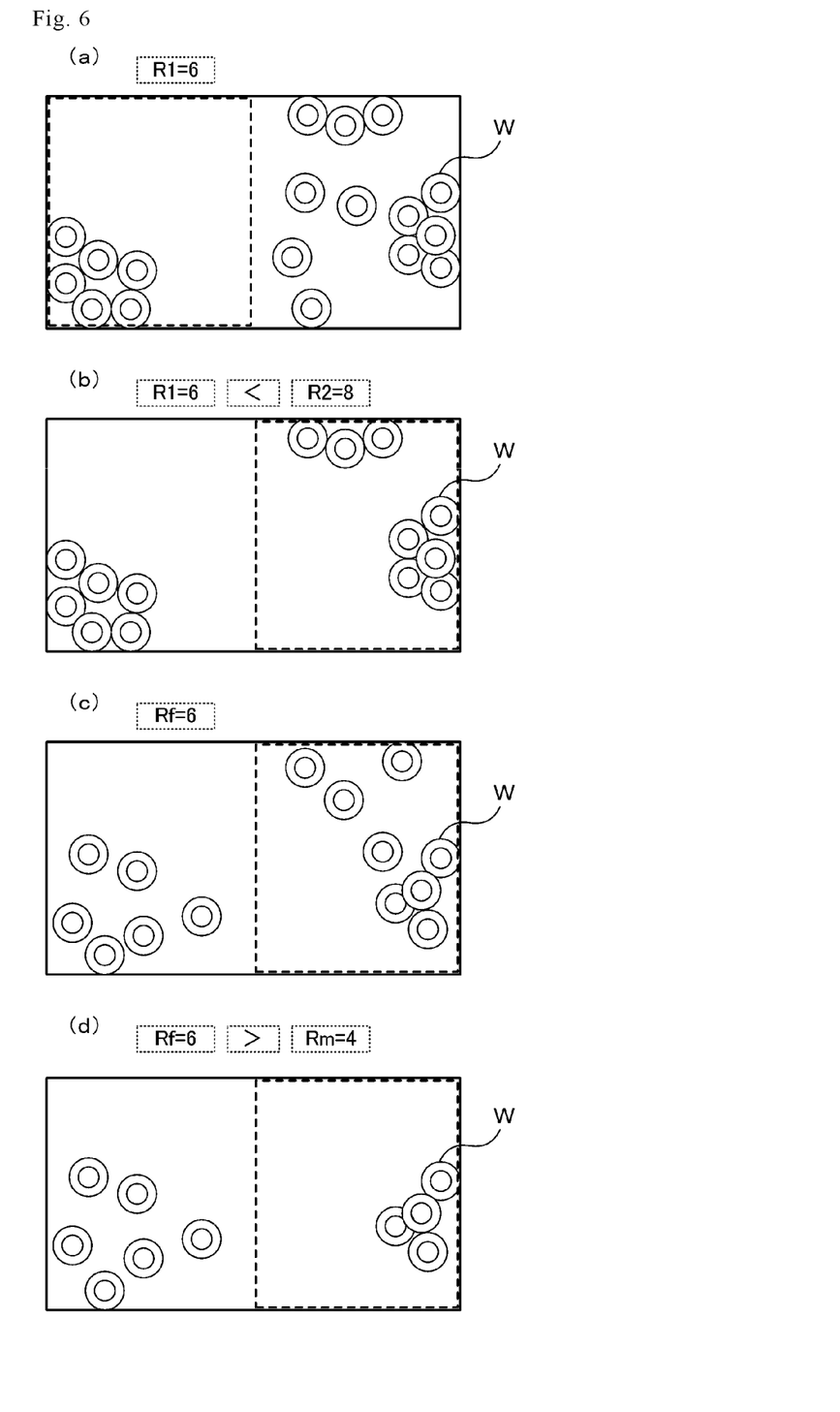
FIG. 6 is a diagram illustrating an example of a change in remaining number R of workpieces.

FIG. 6 is a diagram illustrating an example of a change in remaining number R of workpieces. (a) of FIG. 6 illustrates a state after the workpiece picking processing of the first region (left side region) in S105 is performed from the state of FIG. 3, and for example, remaining number R1 of the first region has a value of 6. In addition. (b) of FIG. 6 illustrates a state after the workpiece picking processing of the second region (right side region) in S115 is performed from the state of (a) of FIG. 6, and for example, remaining number R2 of the second region has a value of 8.

In the work processing routine of FIG. 4, after performing the workpiece picking processing of S115. CPU 51 calculates total number Sa as total number S of remaining numbers R (S120). Total number Sa is the total number of workpieces remaining on supply stage 25 after the workpiece picking processing is performed in each region, and is the sum of remaining number R1 of the first region and remaining number R2 of the second region. In addition, in the example of FIG. 6, the value is 14 ((b) of FIG. 6). Subsequently. CPU 51 determines whether total number Sa is equal to or greater than predetermined number Sref (S125). Predetermined number Sref may be a value that can be appropriately set by the operator according to the size of supply stage 25, the type of the workpiece, or the like, or may be a fixed value. When CPU 51 determines that total number Sa is equal to or greater than predetermined number Sref. CPU 51 causes workpiece supply device 20 to perform the loosening operation of the workpiece on supply stage 25 without supplying the new workpiece to supply stage 25 because a relatively large number of workpieces remain (S130), and proceeds to S140. On the other hand, when CPU 51 determines that total number Sa is not equal to or greater than predetermined number Sref but less than predetermined number Sref. CPU 51 causes workpiece supply device 20 to perform the loosening operation of the workpiece after supplying the new workpiece to supply stage 25 (S135), and proceeds to S140.

Next. CPU 51 determines between a large-number region having a large remaining number R and a small-number region (remaining number Rf) having a small remaining number R in the calculation of total number S (Sa or Sb described later) (S140). In the example of FIG. 6, the second region is a large-number region and the first region is a small-number region because remaining number R2 of the second region is larger than remaining number R1 of the first region ((b) of FIG. 6). In addition, in S140. CPU 51 stores the value 6 of remaining number R1 of the first region as remaining number Rf of the small-number region. Then. CPU 51 controls work robot 40 such that camera 45 moves to the imaging position of the large-number region (S145), and performs the workpiece picking processing of the large-number region (S150). That is. CPU 51 performs the workpiece picking processing by setting a large-number region having larger remaining number R as the next processing target before performing the loosening operation of the workpiece in S130 or before performing the supply and loosening operation of the workpiece in S135. The workpiece may move between the regions by the loosening operation, but even if the workpiece moves, it can be said that the movement from the first region to the second region and the movement from the second region to the first region occur in the same way. Therefore, in S140 and S150, a large-number region after the previous workpiece picking processing is set as the next processing target without particularly considering the change in remaining number R due to the movement of the workpiece between the regions. In addition, since the workpiece picking processing of S150 is performed based on the flowchart of FIG. 5 similarly to S105 and S115, description thereof will be omitted. In addition, remaining number R after the workpiece picking processing of S150 is set as remaining number Rm. In the example of FIG. 6, since the second region is a large-number region, the workpiece picking processing of the second region is performed ((c) and (d) of FIG. 6). Since the workpiece picking processing is not performed on the first region determined to be the small-number region in S140, remaining number Rf remains at the value 6.

When the workpiece picking processing of S150 is performed. CPU 51 calculates total number Sb as total number S of remaining numbers R (S155). Total number Sb is the sum of remaining number Rm after the workpiece picking processing of the large-number region and remaining number Rf of the small-number region. In the example of FIG. 6, remaining number Rm of the second region, which is a large-number region, is, for example, the value 4, and remaining number Rf of the first region, which is a small-number region, remains at the value 6, and thus total number Sb is the value 10 ((d) of FIG. 6). In this example, remaining number Rf of the first region is larger than remaining number Rm of the second region.

Subsequently. CPU 51 determines whether total number Sb is equal to or greater than predetermined number Sref (S160). Predetermined number Sref in S160 is the same as predetermined number Sref in S125, but may be a different number. When CPU 51 determines that total number Sb is equal to or greater than predetermined number Sref. CPU 51 causes workpiece supply device 20 to perform the loosening operation of the workpiece on supply stage 25 without supplying the new workpiece to supply stage 25 (S165), and proceeds to S140. In addition, when CPU 51 determines that total number Sb is not equal to or greater than predetermined number Sref but less than predetermined number Sref in S160. CPU 51 causes workpiece supply device 20 to perform the loosening operation of the workpiece after supplying the new workpiece to supply stage 25 (S170), and proceeds to S100. That is, in this case, the picking processing is performed again in the order of the first region and the second region.

In S140 performed after S165. CPU 51 determines between a large-number region having a large remaining number R and a small-number region (remaining number Rf) having a small remaining number R in the calculation of total number Sb. and performs the processing of S145 and thereafter. That is, the workpiece picking processing is performed for the large-number region when total number Sb is calculated in S155. In the example of FIG. 6, as illustrated in (d) of FIG. 6, since the first region is the large-number region and the second region is the small-number region, remaining number Rf is the value 4 of remaining number R of the second region, and the workpiece picking processing of the first region is performed. Although not illustrated, when the picking processing of the first region is performed in S145 and S155, remaining number R of the first region becomes remaining number Rm. In S155. CPU 51 calculates total number Sb of remaining number Rm and remaining number Rf (value 4) of the second region. In this way, when the required number of workpieces are picked up from supply stage 25 while the selection of the target region (large-number region) and the workpiece picking processing of the target region are performed, the work processing routine ends.

Here, a correspondence relationship between the elements of the present embodiment and the elements of the present disclosure will be clarified. S105 and S115 (excluding S225 of FIG. 5) of the work processing routine of the present embodiment correspond to a step (a). S225 of FIG. 5 when performing S105 and S115 corresponds to a step (b). S120 to S135 of the work processing routine correspond to a step (c), and S140. S145, and S150 (excluding S225 of FIG. 5) of the work processing routine correspond to a step (d). S225 of FIG. 5 when performing S150 corresponds to a step (e), and S155 to S170 of the work processing routine correspond to a step (f). In addition, camera 45 corresponds to an imaging section, supply stage 25 of workpiece supply device 20 corresponds to a supply stage, work robot 40 corresponds to a picking section, sending and feeding section 22 (lifting and lowering device 23) of workpiece supply device 20 corresponds to a supply section, vibration device 26 of workpiece supply device 20 corresponds to a loosening section, and control device 50 corresponds to a control section.

As described above, in the workpiece picking method of the present disclosure, a loosening operation is performed after a workpiece is supplied or the loosening operation is performed without supplying the workpiece based on remaining number R (R1. R2) of workpieces for each region after the workpiece picking processing. In addition, before the loosening operation (when total number S is calculated), the workpiece picking processing after the loosening operation is performed for a large-number region where remaining number R of workpieces is large as a target. In the large-number region, since there is a high probability that the number of workpieces is relatively large even after the loosening operation, by performing the workpiece picking processing for the large-number region after the loosening operation, it is possible to prevent inefficient workpiece picking processing in a region with a small number of workpieces and wasteful imaging processing in a region where no workpieces exist. In addition, since it is not necessary to perform processing of determining a target region by capturing an image of each region after the loosening operation, the cycle time can be shortened.

In addition, based on remaining number Rm after the workpiece picking processing is performed in the large-number region and remaining number Rf of the small-number region, the loosening operation is performed after the workpiece is supplied, or the loosening operation is performed without supplying the workpiece. That is, since the workpiece picking processing is performed in the large-number region and then the processing moves to the next without capturing an image of the small-number region, the cycle time can be shortened by omitting the imaging processing.

In addition, in a case where the workpiece is supplied after the workpiece picking processing of the large-number region and then the loosening operation is performed, the processing proceeds to S100, so that when there is a high possibility that there is a workpiece that can be picked up in each region by the supply of the workpiece, the workpiece picking processing for each region can be performed subsequently. On the other hand, in a case where the loosening operation is performed without supplying the workpiece after the workpiece picking processing of the large-number region, the processing proceeds to S140, so that the large-number region can be reselected and the workpiece picking processing for the large-number region can be performed. Therefore, in a case where there is a probability that there is a region where the number of workpieces that can be picked up is small or a region where there is no workpiece because workpiece is not supplied, it is possible to prevent inefficient workpiece picking processing or wasteful imaging processing by performing workpiece picking processing in the large-number region.

It is needless to say that the present disclosure is not limited in any way to the above-described embodiment, and the present disclosure can be embodied in various aspects as long as the aspects fall within the technical scope of the present disclosure.

Figure 7:
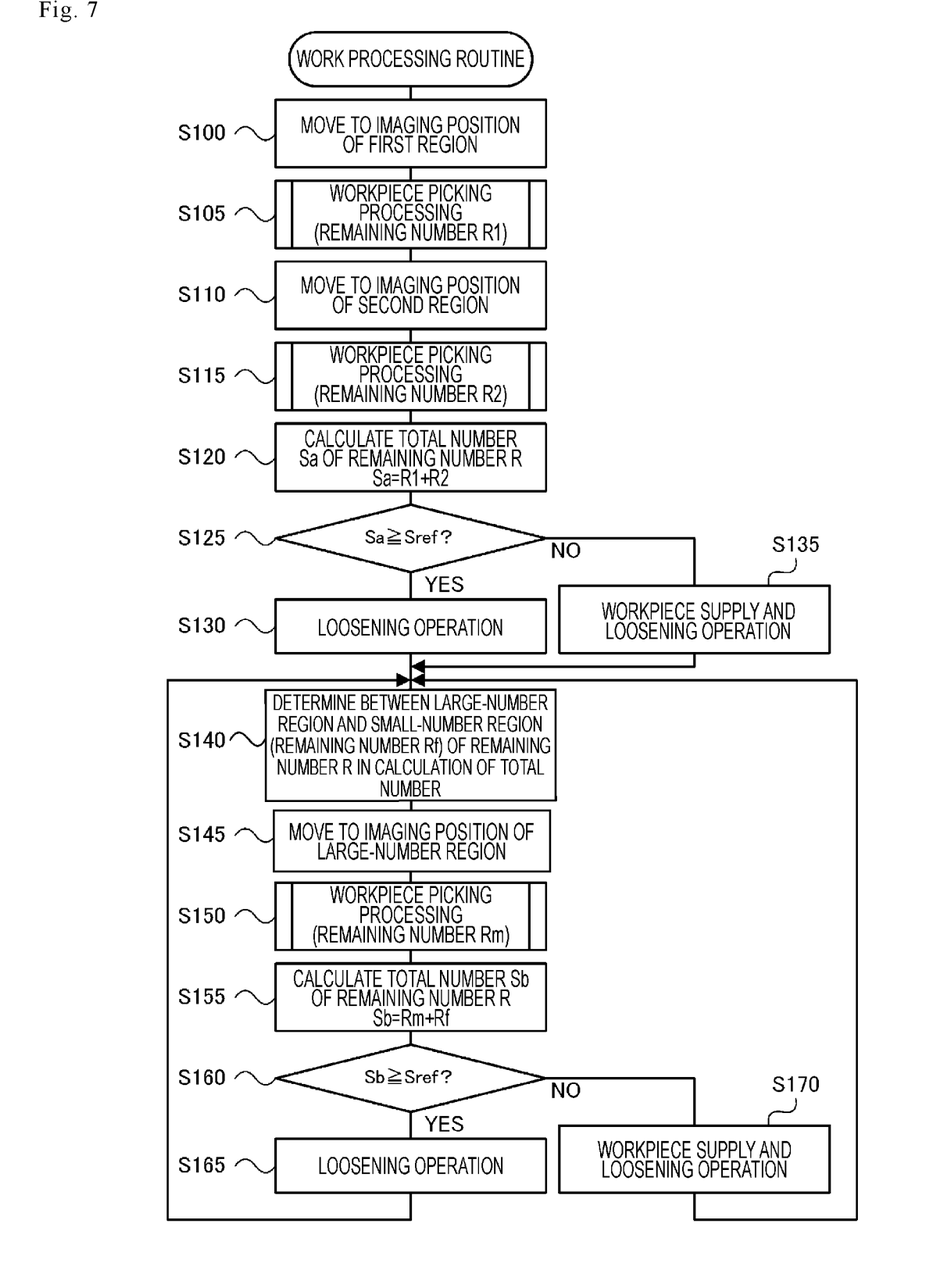
FIG. 7 is a flowchart illustrating a work processing routine according to a modification example.

In the embodiment described above, in a case where the workpiece picking processing is performed in the large-number region, the workpiece is supplied, and then the loosening operation is performed (in a case where S170 is executed), the processing proceeds to S100, but the present disclosure is not limited to this. FIG. 7 is a flowchart illustrating a work processing routine according to a modification example. The work processing routine of the modification example is different from that of the embodiment in that the processing proceeds to S140 instead of S100 after S170 is executed. Accordingly, when the loosening operation is performed in S165 and S170, it is possible to reselect the large-number region and perform the workpiece picking processing for the large-number region. That is, since it is possible to repeatedly perform the workpiece picking processing for the large-number region, it is possible to prevent inefficient workpiece picking processing or wasteful imaging processing for a region where the number of workpieces that can be picked up is small or a region where there is no workpiece.

In the embodiment, in the calculation of total number Sb in S155 after S165 is executed and the processing proceeds to S140, actual remaining number Rm after the workpiece picking processing is used as remaining number R of the large-number region, and remaining number Rf acquired before the loosening operation (in the calculation of total number S) is used as remaining number R of the small-number region, but the present disclosure is not limited to this. For example, CPU 51 may capture an image of the small-number region with camera 45 and acquire actual remaining number R. In addition, as in the modification example described above, in a case where the processing proceeds to S140 after S165 and S170, the following processing may be performed. That is, after performing only the loosening operation in S165, since the probability that remaining number R for each region is changed is low. CPU 51 may use remaining number Rf acquired before the loosening operation as remaining number R of the small-number region. On the other hand, in a case where the supply of the workpiece and the loosening operation are performed in S170, since a probability that remaining number R for each region is changed is high. CPU 51 need only acquire actual remaining number R by imaging the small-number region with camera 45.

In the embodiment, based on total number S (Sa. Sb) of remaining numbers R of the regions, the loosening operation is performed without supplying the workpiece, or the loosening operation is performed after supplying the workpiece, but the present disclosure is not limited to this. Based on remaining number R of one region (large-number region), which is a next processing target, the loosening operation may be performed without supplying the workpiece, or the loosening operation may be performed after the workpiece is supplied. In addition, there may be a case where the determination is made based on total number S of remaining numbers R of each region, such as in S125, the determination is made based on total number S (Sa) of remaining numbers R of each region, and in S160, the determination is made based on remaining number Rm of the large-number region, or a case where the determination is made based on remaining number R (remaining number Rm) of one region.

In the embodiment, supply stage 25 is divided into two regions of the first region and the second region, but the present disclosure is not limited to this, and supply stage 25 may be divided into three or more regions. For example, supply stage 25 may be divided into three regions of a left region, a central region, and a right region.

In a case where supply stage 25 is divided into n (n is multiple) regions as described above, the work processing routine of FIG. 4 (FIG. 7) may be performed as follows. First, in S100 to S115, the workpiece picking processing is performed for each of the n regions, and in S120, total number Sa of remaining numbers R after the workpiece picking processing for each region is calculated. In S125 to S135, as in the embodiment, total number Sa of remaining numbers R is compared with predetermined number Sref. and S130 or S135 is executed. In S140, the large-number region is set as the largest-number region having the largest remaining number among the n regions, and the small-number region is set as a region that is not the largest-number region, that is, the remaining (n−1) other regions. Then, in S145 and S150, the workpiece picking processing of the largest-number region is performed, and in S155 to S170, total number Sb of remaining number Rm after the workpiece picking processing of the largest-number region and remaining number of other regions is calculated, total number Sb is compared with predetermined number Sref. and S165 or S170 is executed. In a case where supply stage 25 is divided into three or more regions, it takes more time to capture an image of each region than in the embodiment.

Therefore, by applying the processing of the present disclosure, the effect of preventing the inefficient workpiece picking processing and the wasteful imaging processing is further enhanced. In addition, after the loosening operation, it is not necessary to capture the image of each region to determine the target region, and the effect of shortening the cycle time by omitting the wasteful imaging processing is also enhanced.

In the embodiment, workpiece supply device 20 includes sending and feeding section 22 that sends the workpiece to supply stage 25 and vibration device 26 that causes the loosening operation of the workpiece on supply stage 25, but the present disclosure is not limited to this. Workpiece supply device 20 may include supply stage 25 and vibration device 26, and the workpiece may be directly replenished onto supply stage 25 by a replenishment robot or the like. Alternatively, workpiece supply device 20 may include only supply stage 25 and cause a robot such as a replenishment robot to perform the loosening operation of the workpiece.

Here, the workpiece picking method of the present disclosure may be performed as follows. For example, in the first workpiece picking method of the present disclosure, the method further including: (e) a step of acquiring a remaining number of the workpieces remaining in the largest-number region after the picking processing in the step (d): and (f) a step of performing the loosening operation after supplying the new workpiece onto the supply stage, or performing the loosening operation without supplying the new workpiece after the picking processing in the step (d), based on a remaining number of the workpieces acquired before the loosening operation in a region other than the largest-number region and the remaining number of the workpieces in the largest-number region acquired in the step (e). With this, it is possible to proceed to the next processing without capturing an image of another region after the picking processing in the largest-number region, and thus it is possible to prevent wasteful processing such as capturing an image of a region where there is no workpiece.

In the first workpiece picking method of the present disclosure, in a case where the loosening operation is performed after the new workpiece is supplied in the step (f), a process may proceed to the step (a), and in a case where the loosening operation is performed without supplying the new workpiece in the step (f), the process may proceed to the step (d). With this, in a case where there is a high probability that there is a workpiece that can be picked up in each region because a new workpiece is supplied, it is possible to return to the step (a) and subsequently perform the picking processing of each region. In addition, in a case where there is a possibility that there is a region where the number of workpieces that can be picked up is small or a region where there is no workpiece because the loosening operation is performed without supplying the new workpiece, it is possible to prevent wasteful processing by performing the picking processing in the largest-number region.

In the first workpiece picking method of the present disclosure, when any of the loosening operations in the step (f) is performed, a process may proceed to the step (d). With this, the picking processing is repeated in the largest-number region, and thus wasteful processing can be prevented.

A second workpiece picking method of the present disclosure is a workpiece picking method for picking up workpieces supplied in a randomly placed state onto a supply stage larger than an imaging range corresponding to an angle of view of an imaging section, the workpiece picking method including: (a) a step of performing picking processing of selecting a workpiece that is capable of being picked up in each of two regions obtained by dividing the supply stage based on the imaging range, based on an image obtained by imaging the region with the imaging section, and of causing a picking section to pick up the workpiece: (b) a step of acquiring a remaining number of the workpieces remaining after the picking processing for each region: (c) a step of supplying a new workpiece onto the supply stage and performing a loosening operation for loosening a lump of the workpieces in a case where a total number of the remaining number of the workpieces for each region is less than a predetermined number, or performing the loosening operation without supplying the new workpiece in a case where the total number is equal to or greater than the predetermined number: and (d) a step of performing the picking processing after the loosening operation in a large-number region having a large remaining number of the workpieces for each region acquired after the picking processing.

In the second workpiece picking method of the present disclosure, as in the first workpiece picking method, the picking processing after the loosening operation is performed in the large-number region where the large remaining number of workpieces acquired before the loosening operation is larger, and thus the workpieces can be efficiently picked up from the supply stage larger than the imaging range of the imaging section. Each step of the first workpiece picking method may be added to the second workpiece picking method.

A workpiece picking system of the present disclosure includes an imaging section, a supply stage that is larger than an imaging range corresponding to an angle of view of the imaging section, a supply section configured to supply a workpiece onto the supply stage, a picking section configured to pick up the workpiece supplied in a randomly placed state onto the supply stage, a loosening section configured to perform a loosening operation for loosening a lump of the workpieces on the supply stage, and a control section, in which the control section is configured to: cause the imaging section and the picking section to perform picking processing of selecting a workpiece that is capable of being picked up in each of multiple regions obtained by dividing the supply stage based on the imaging range, based on an image obtained by imaging the region, and of picking up the workpiece: cause the supply section and the loosening section to supply a new workpiece onto the supply stage and performing the loosening operation for loosening the lump of the workpieces, or performing the loosening operation without supplying the new workpiece, based on the remaining number of the workpieces for each region remaining after the picking processing; and cause the imaging section and the picking section to perform the picking processing after the loosening operation in a largest-number region having a largest remaining number of the workpieces for each region acquired after the picking processing.

In the workpiece picking system of the present disclosure, as in the first workpiece picking method described above, the picking processing after the loosening operation is performed in the largest-number region after the picking processing. Therefore, the workpiece can be efficiently picked up from the supply stage larger than the imaging range of the imaging section. In the workpiece picking system, a function for achieving each step of the first workpiece picking method may be added.

INDUSTRIAL APPLICABILITY

The present disclosure can be used in a technical field of a system for picking up and placing a workpiece.

REFERENCE SIGNS LIST

10: work system, 20, 20A, 20B: workpiece supply device, 22: sending and feeding section, 22a: first inclined portion, 22b: second inclined portion, 22c: third inclined portion, 23: lifting and lowering device, 25: supply stage, 26: vibration device, 30: tray conveyance device, 32: belt conveyor, 40: work robot, 42: robot arm, 44: end effector, 45: camera, 50: control device, 51: CPU, 52: ROM, 53: RAM, 54: HDD, B: bolt, T: tray, W: washer

The invention claimed is:

1. A workpiece picking method for picking up workpieces supplied in a randomly placed state onto a supply stage larger than an imaging range corresponding to an angle of view of a camera, the workpiece picking method comprising:
(a) a step of performing picking processing of selecting a workpiece that is capable of being picked up in each of multiple regions obtained by dividing the supply stage based on the imaging range, based on an image obtained by imaging the region with the camera, to cause a robot to pick up the workpiece, the camera being attached to the robot;
(b) a step of acquiring a remaining number of the workpieces remaining after the picking processing for each region;
(c) a step of supplying a new workpiece onto the supply stage and performing a loosening operation for loosening a lump of the workpieces when the remaining number of the workpieces for each region is less than a predetermined number, or performing the loosening operation without supplying the new workpiece when the remaining number of the workpieces for each region is greater than or equal to the predetermined number; and
(d) a step of performing the picking processing after the loosening operation in a largest-number region having a largest remaining number of the workpieces for each region acquired after the picking processing.

2. The workpiece picking method according to claim 1, further comprising:
(e) a step of acquiring a remaining number of the workpieces remaining in the largest-number region after the picking processing in the step (d); and
(f) a step of performing the loosening operation after supplying the new workpiece onto the supply stage, or performing the loosening operation without supplying the new workpiece after the picking processing in the step (d), based on a remaining number of the workpieces acquired before the loosening operation in a region other than the largest-number region and the remaining number of the workpieces in the largest-number region acquired in the step (e).

3. The workpiece picking method according to claim 2, wherein in a case where the loosening operation is performed after the new workpiece is supplied in the step (f), a process proceeds to the step (a), and in a case where the loosening operation is performed without supplying the new workpiece in the step (f), the process proceeds to the step (d).

4. The workpiece picking method according to claim 2, wherein when any of the loosening operations in the step (f) is performed, a process proceeds to the step (d).

5. A workpiece picking method for picking up workpieces supplied in a randomly placed state onto a supply stage larger than an imaging range corresponding to an angle of view of a camera, the workpiece picking method comprising:

(a) a step of performing picking processing of selecting a workpiece that is capable of being picked up in each of two regions obtained by dividing the supply stage based on the imaging range, based on an image obtained by imaging the region with the camera, to cause a robot to pick up the workpiece, the camera being attached to the robot;

(b) a step of acquiring a remaining number of the workpieces remaining after the picking processing for each region;

(c) a step of supplying a new workpiece onto the supply stage and performing a loosening operation for loosening a lump of the workpieces in a case where a total number of the remaining numbers of the workpieces for each region is less than a predetermined number, or performing the loosening operation without supplying the new workpiece in a case where the total number is equal to or greater than the predetermined number; and (d) a step of performing the picking processing after the loosening operation in a largest-number region having a largest remaining number of the workpieces for each region acquired after the picking processing.

6. A workpiece picking system comprising:
a camera;
a supply stage that is larger than an imaging range corresponding to an angle of view of the camera;
a supply section configured to supply a workpiece onto the supply stage;
a robot configured to pick up the workpiece supplied in a randomly placed state onto the supply stage, the camera being attached to the robot;
a loosening section configured to perform a loosening operation for loosening a lump of the workpieces on the supply stage; and
a control section,
wherein the control section is configured to:
cause the camera and the robot to perform picking processing of selecting a workpiece that is capable of being picked up in each of multiple regions obtained by dividing the supply stage based on the imaging range, based on an image obtained by imaging the region, and of picking up the workpiece;
cause the supply section and the loosening section to supply a new workpiece onto the supply stage and perform the loosening operation for loosening the lump of the workpieces when the remaining number of the workpieces for each region is less than a predetermined number, or perform the loosening operation without supplying the new workpiece when the remaining number of the workpieces for each region is greater than or equal to the predetermined number; and
cause the camera and the robot to perform the picking processing after the loosening operation in a largest-number region having a largest remaining number of the workpieces for each region acquired after the picking processing.

* * * * *